United States Patent [19]

Shigeta et al.

[11] Patent Number: 4,666,755
[45] Date of Patent: May 19, 1987

[54] POROUS FUEL CELL ELECTRODE SUBSTRATE HAVING ELONGATED HOLES FOR FEEDING REACTANT GASES

[75] Inventors: Masatomo Shigeta; Kuniyuki Saitoh; Hiroyuki Fukuda, all of Iwaki, Japan

[73] Assignee: Kureha Kagaku Kogyo Kabushiki Kaisha, Tokyo, Japan

[21] Appl. No.: 771,187

[22] Filed: Sep. 3, 1985

Related U.S. Application Data

[63] Continuation of Ser. No. 535,299, Sep. 23, 1983, abandoned.

[30] Foreign Application Priority Data

Oct. 1, 1982 [JP] Japan ................. 57-172994

[51] Int. Cl.$^4$ ........................................... H01M 4/96
[52] U.S. Cl. ..................... 428/188; 428/224; 428/255; 428/332; 428/408; 429/34; 429/44
[58] Field of Search ............. 428/408, 188, 332; 429/40, 44, 34, 255, 224

[56] References Cited

U.S. PATENT DOCUMENTS

| 2,276,188 | 3/1942 | Greger ................. 136/86 |
| 3,177,097 | 4/1965 | Beals ................... 136/86 |
| 3,268,385 | 8/1966 | Juel et al. ............. 428/408 |
| 3,692,585 | 9/1972 | Mayo ................. 136/86 R |
| 4,115,627 | 9/1978 | Christner ............. 429/44 |
| 4,185,145 | 1/1980 | Breault ................ 429/44 |
| 4,269,642 | 5/1981 | Decasperis et al. ..... 156/89 |
| 4,522,895 | 6/1985 | Shigeta et al. ........ 429/209 |
| 4,580,337 | 4/1986 | Shigeta et al. ........ 429/209 |

Primary Examiner—Paul J. Thibodeau
Attorney, Agent, or Firm—Oblon, Fisher, Spivak, McClelland & Maier

[57] ABSTRACT

A porous carbonaceous electrode substrate for a fuel cell disclosed herein has elongated holes for feeding reactant gases to the fuel cell. The holes are elongated from one side to the opposite side of the substrate and parallel to each other and to the electrode surface.

7 Claims, 2 Drawing Figures

POROUS FUEL CELL ELECTRODE SUBSTRATE HAVING ELONGATED HOLES FOR FEEDING REACTANT GASES

This application is a continuation of application Ser. No. 535,299, filed Sept. 23, 1983 abandoned.

BACKGROUND OF THE INVENTION

The present invention relates to a fuel cell electrode substrate, more particularly to an electrode substrate which has elongated holes for feeding reactant gases (hydrogen as a fuel gas and oxygen or air) to a fuel cell.

DESCRIPTION OF THE PRIOR ART

A bipolar fuel cell is known which has a ribbed bipolar separator prepared from an impermeable thin plate of graphite. On the other hand, a ribbed electrode substrate for a monopolar fuel cell has been developed which has a ribbed surface and a flat surface to be in contact with a catalyst layer. Such an electrode substrate is carbonaceous and porous as a whole.

A conventional monopolar fuel cell using such an electrode substrate is illustrated in FIG. 1. A cell is composed of two electrode substrates 1, two catalyst layers 2, a matrix layer 3 impregnated with an electrolyte and two separator sheets 4 to be in contact with ribs 5 of the substrate 1 in a stack of such cells to form a fuel cell. The reactant gases are fed via channels formed by the ribs 5 and the separator sheet 4 and the gases diffuse from the ribbed surface to the flat surface in the porous electrode substrate 1 to reach the catalyst layer 2.

For preparing such an electrode substrate, the following methods previously proposed may be used. For example, one method for preparing a general electrode substrate was proposed in Japanese Patent Application Laying Open No. 166354/82 wherein a mixture based on short carbonaceous fibers is pressed to form a porous shaped article. Another method was described in Japanese Patent Publication No. 18603/78 in which method a machined paper of carbon fibers is impregnated with an organic polymer solution and made into a porous carbon fiber paper. A still another method for preparing an electrode substrate was proposed in U.S. Pat. No. 3,829,327 wherein a web of carbon fiber is subjected to chemical vapor deposition of carbon to form a porous electrode substrate. All electrode substrates have substantially homogeneous monolayer structures.

Such a homogeneous monolayer electrode substrate has, however, the following disadvantages: with a high bulk density of a substrate, there is obtained only low limiting current density due to less diffusion of the reactant gases and a rapid deterioration of performance of a fuel cell due to insufficient storage of electrolyte in the substrate, and therefore the life of a fuel cell is shortened; on the other hand, disadvantages are high electric and thermal resistances and a low mechanical strength such as a bending strength with a low bulk density of an electrode substrate.

Moreover, in the case of an electrode substrate with ribs, the section modules thereof is reduced due to a ribbed surface, as seen from FIG. 1, and stress is concentrated at the sharp edge portion 6 of ribs 5 resulting in an insufficient mechanical strength of the whole electrode substrate. A thick substrate is, therefore, inevitable in order to obtain a sufficient strength as a shaped substrate, that is, the resistance to diffusion of the reactant gases from the ribbed surface to the flat surface is increased. On the other hand, it is difficult to obtain a complete flatness of the top surface of the ribs and the incomplete flatness of the ribs' top causes significantly large contact electric and thermal resistances between the ribs' top surface and a separator sheet. As generally known such a contact resistance is occasionally several times larger than the conductive resistance in the substrate, and therefore, a conventional monopolar electrode substrate showed lack of uniform distribution of temperature in a cell and reduction of generation efficiency due to the large contact resistance.

It is an object of the present invention to provide an electrode substrate without such demerits.

SUMMARY OF THE INVENTION

Accordingly, it is an object of the present invention to provide a fuel cell electrode substrate without ribs.

A still another object of the invention is to provide an electrode substrate which has elongated holes for feeding the reactant gases to a fuel cell.

An electrode substrate for a fuel cell to be provided by the present invention has a plurality of holes near the center of the thickness of the substrate, these holes being elongated from one side of the substrate to the other side and being parallel to each other and to the electrode surface. These holes provide feeding channels for the reactant gases to a fuel cell. The electrode substrate is porous and carbonaceous as a whole.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein.

Figure 1:
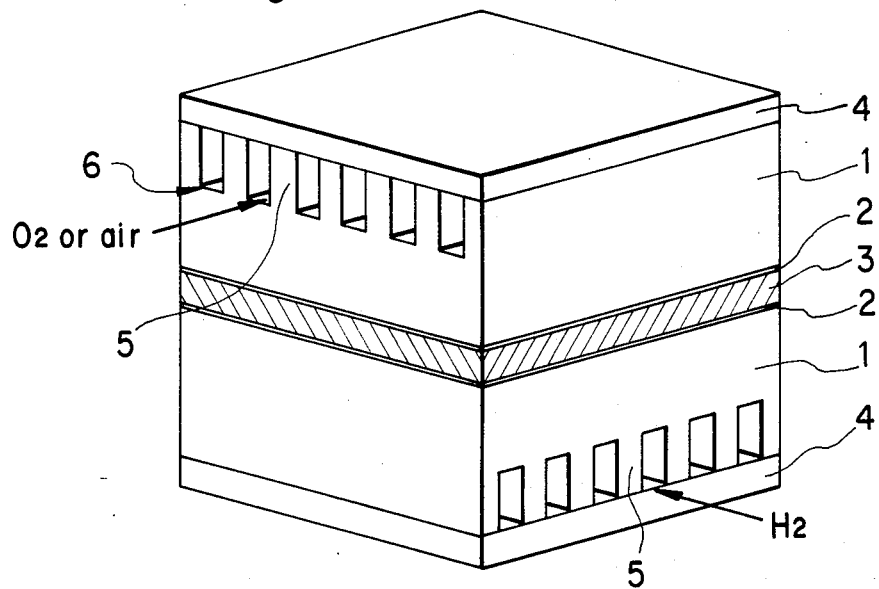
FIG. 1 shows the cell structure of a fuel cell with ribbed monopolar electrode substrates according to the prior art.

The "electrode surface" or, in some cases, "surface" herein refers to a surface of a fuel cell, an electrode substrate or a component layer thereof which is parallel to the surface of the catalyst layer (2 in FIG. 1) to be contacted with a substrate or a matrix layer (3 in FIG. 1). The "side" or, occasionally, "side surface" herein refers to a surface of a fuel cell, an electrode substrate or a component layer thereof which is perpendicular to said "electrode surface".

DESCRIPTION OF THE PREFERRED EMBODIMENT

Figure 2:
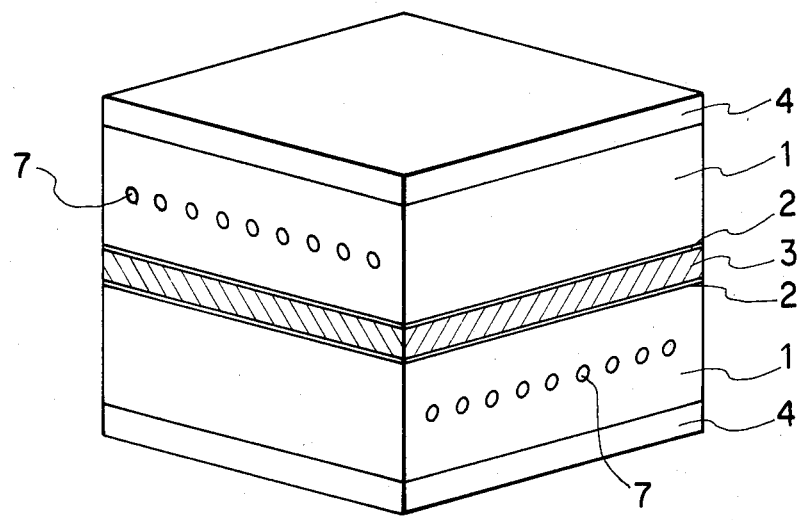
FIG. 2 shows the cell structure of a fuel cell according to the present invention.

Referring now to the drawings, wherein like reference numerals designate identical or corresponding parts throughout the several views and more particularly to FIG. 2 thereof, there is shown an explanatory view of a fuel cell which has an electrode substrate 1 which is porous and carbonaceous as a whole. As shown in FIG. 2, the elongated holes 7 for feeding reactant gases to a fuel cell are provided near the center of the thickness of the substrate 1. These holes 7 are parallel to each other and to the electrode surface and continuously elongated from one side of the substrate 1 to the opposite side of the substrate 1. Although the cross section of the holes 7 may be circular as shown in FIG. 2, any form of the cross section of the holes 7 may be utilizable in the present invention. The cross section of the hole 7 is preferably about 0.2–7 mm$^2$, this cross section corresponding to a diameter of 0.5–3 mm in the typical case of circular cross section. With smaller size the resistance to diffusion of reactant gases becomes too high. On the hand, a larger size cross-section will, depending upon the thickness of the substrate, result in a reduction of the volume efficiency of a fuel cell in the stack.

The electrode substrate 1 comprises uniformly porous and carbonaceous material. The substrate 1 has an average bulk density of 0.3–1.0 g/cm$^3$, preferably 0.4–0.8 g/cm$^3$ and a specific gas permeability to the reactant gases of not less than 20 ml/cm.hr.mmAq. The electrode substrate having such a bulk density and a specific gas permeability is preferable for a fuel cell in view of a mechanical strength such as a bending strength and a resistance to diffusion of reactant gases. Furthermore, the pores of the electrode substrate 1 are open pores and preferably, not less than 60% of the pores have a diameter in the range of 10–100$\mu$.

The electrode substrate may be prepared as follows, for example, in the present invention.

10–50% by weight of a filler such as short carbon fiber and granular active carbon, 10–40% by weight of a binder such as phenol resin, epoxy resin and petroleum and/or coal pitch and 20–50% by weight of a pore regulator such as polyvinyl alcohol, polyethylene, polypropylene, polyvinyl chloride and sugar are blended to be a homogeneous mixture. The mixed amount of the components is an only example and not limited in the above-mentioned ranges. The mixture is then fed into a die having a proper configuration. On the introduced mixture a polymer material in the form of cloth (or textile) or reed screen-like sheet (or lattice) for forming elongated holes such as polyethylene, polypropylene, polystyrene, polyvinyl alcohol and polyvinyl chloride is supplied and thereafter the same mixture as above-mentioned is again fed. Pressing is then carried out at a temperature of the die of 70°–200° C. under a pressure of 5–100 kg/cm$^2$ for 1–60 minutes. The pressing conditions may be selected according to the object from the wider range than above-mentioned. The resultant shaped sheet is postcured at 120°–170° C. under a pressure of not more than 5 kg/cm$^2$ for at least two hours and calcined at 1000°–3000° C. for about one hour in an inert atmosphere. In the heating procedure, a slow increase of temperature up to about 700° C. is preferable in order to prevent generation of stress due to sudden shrinkage on thermal decomposition at low temperature. Such stress would cause exfoliation of layers and/or crack.

The electrode substrate of the present invention has a flat surface to be in contact with the separator sheet in a stack to form a fuel cell and also an another flat surface to be in contact with the catalyst layer 2, therefore the substrate has a larger section modulus and an improved mechanical strength such as the bending strength than a conventional ribbed electrode substrate. Furthermore, the bending strength may be further improved since the holes 7 are provided near the center of the thickness of the substrate 1 as shown in FIG. 2. further advantages of the invention, are that, a thinner substrate may be obtained resulting in a shorter diffusion path or a lower resistance to diffusion of reactant gases and a larger current density. A separator sheet can be contacted with the whole surface of the electrode substrate of the invention and therefore electric and thermal contact resistance can be reduced. The cost for preparing the electrode substrate of the invention may be markedly reduced compared with a conventional substrate for a fuel cell, for example a ribbed electrode substrate 1 shown in FIG. 1. Thus the electrode substrate of the present invention is well suitable for a fuel cell.

The electrode substrate 1 of the present invention is used as shown in FIG. 2 in a stack via a separator sheet 4 to form a fuel cell.

The advantages of the invention will be more apparent from the following Table 1 showing the physical properties of the electrode substrate of the invention and the prior art (FIG. 1) for comparison.

TABLE 1

| | | prior art | present invention |
|---|---|---|---|
| thickness of substrate (mm) | | 2.4 | 2.0 |
| thickness of a cell (mm) | | 5.8[1] | 5.0[1] |
| bending strength (kg/cm$^2$) | | 100 | 150 |
| compressive strength (kg/cm$^2$) | | 100 | 150 |
| electric resistance (m$\Omega$)[2] | substrate | 8 | 6 |
| | contact resistance[3] | 30 | 20 |
| | total of a cell | 77[4] | 53[4] |
| thickness for gas diffusion (mm) | | 1.2 | 1.0 |
| limiting current (mA/cm$^2$) | | 400 | 500 |
| volumetric power (KW/m$^3$)[5] | | 207 | 240 |

Note:
[1]separator sheet (0.5 mm) + two substrates + matrix layer (0.5 mm)
[2]resistance per 1 cm$^2$
[3]resistance measured at contact pressure of 1 kg/cm$^2$
[4]separator sheet (1 m$\Omega$) + two substrates + two contact resistances
[5]measured at 200 mA/cm$^2$ The present invention will be illustrated while referring to the following non-limiting example. It will be understood that various modifications may be carried out by those skilled in the art without difficulty and those variations will be included in the present invention.

In the example, the "porosity P (%)" was determined by the following equation while assuming that the real density of a carbonaceous substrate was 1.6 g/cm$^3$;

$$P = (-\rho_b/1.6) \times 100$$

wherein $\rho_b$ was the measured bulk density (g/cm$^3$) of a specimen, the "bending strength (kg/cm$^2$)" of a porous carbonaceous shaped article was determined according to Japanese Industrial Standards (JIS) K-6911/1970 while using a specimen with a dimension of 100×10×2.5 mm, and the "average pore diameter ($\mu$m)" of a specimen was measured by a mercury porosimeter (manufactured by Carlo Erba Strumentazione, Italia). The "specific gas permeability $Q_s$ (ml/cm. hr. mmAq.)" was determined in the following manner: a cylindrical specimen of 90 mm in diameter and t mm in thickness was cut out from a substrate to be measured, the circumferential side surface of the specimen was treated with a thermosetting resin so that gas might not permeate therethrough, both longitudinal end surfaces of the specimen were then put between two cylindrical gas tubes with a flange holding a gasket, a predetermined amount (10 l/min) of air was supplied from one end of the specimen to the other end thereof which was open to the atmosphere, the pressure loss between two ends of the specimen was measured by a manometer attached to the upstream of the gas tube and the specific gas permeability $Q_s$ was then calculated by the following equation;

$$Q_s = \frac{6 \times t \times 10^4}{50.24 \times \Delta p}$$

wherein Δp was the measured pressure loss (mmAq.) and 50.24 cm² was a real area to be measured (a circle of 80 mm in diameter). Further, the "volume resistivity $\rho_V$ (Ωcm)" was determined in the following manner: both ends of a specimen were coated with an electroconductive coating material and an electrical resistance between two ends of the specimen was measured according to SRIS (Standards of Japan Rubber Association) 2301-1969, and then the volume resistivity was calculated by the following equation;

$$\rho_V = R \cdot w \cdot t / l$$

wherein R was the measured resistance (Ω) between the ends of the specimen, l (cm) was a longitudinal length (direction to be measured), and w (cm) and t (cm) were a horizontal and a vertical lengths, respectively, defining a cross section of the specimen.

EXAMPLE

A homogeneous mixture was prepared by blending 40% by weight of short carbon fiber with an average fiber length of 0.45 mm and an average fiber diameter of 12 μm (manufactured by Kureha Chemical Industry Co., Ltd. M104S), 30% by weight of granular polyvinyl alcohol with an average particle diameter of 180 μm (manufactured by The Nippon Synthetic Chemical Industry Co., Ltd.) as a pore regulator and 30% by weight of phenol resin (manufactured by Asahi Organic Material K.K.) as a binder.

The mixture was supplied into a die for press molding. On the supplied mixture a reed-like shaped polyvinyl alcohol as a material for forming elongated holes was placed, and then the homogeneous mixture was again supplied on the material for holes.

The supplied materials were pressed at 140° C. and 50 kg/cm² for about 30 minutes and then calcinated at 2000° C. for about one hour.

The obtained electrode substrate of 300 mm in length, 300 mm in width and 2 mm in thickness had elongated holes which had an approximately circular cross section of about 0.8 mm in diameter, a distance between two adjacent holes being 5 mm. The physical properties of the substrate are shown in the following Table 2.

TABLE 2

| | |
|---|---|
| bulk density[1] | 0.51 g/cm³ |
| porosity[1] | 74% |
| specific gas permeability[2] | 120 ml/cm.hr.mmAq. |
| bending strength | 142 kg/cm² |
| volume resistivity | 27 × 10⁻³ Ωcm |
| average pore diameter[3] | 31μ |

Note:
[1] inclusive of holes
[2] from hole to one surface, that is a half of the thickness of the substrate (about 1 mm)
[3] exclusive of holes

What is claimed is:

1. A carbonaceous electrode substrate for a fuel cell, comprising a uniformly porous and carbonaceous material, said electrode substrate having a first flat surface to be in contact with a separator sheet in a stack to form a fuel cell, a second flat surface to be in contact with a catalyst layer and an average bulk density of 0.4 to 0.8 g/cm³ and a specific gas permeability of not less than 20 ml/cm.hr.mm Aq., not less than 60% of pores in said electrode substrate having diameter of 10–100μ, a plurality of elongated holes for feeding reactant gases parallel to said flat surfaces of the electrode substrate and to each other extending from one side of the electrode substrate to an opposite side, the holes being provided substantially at the center of the thickness of said electrode substrate and having a cross section of about 0.2–7 mm², and said holes being formed by interposing a polymer sheet material selected from the group consisting of polyethylene, polypropylene, polystyrene, polyvinyl alcohol and polyvinyl chloride as a raw material for forming said holes between said raw materials for said electrode substrate, and calcinating thereof in an inert atmosphere.

2. A carbonaceous electrode substrate according to claim 1, wherein the raw material for said electrode substrate comprises 10–50% by weight of a filler of short carbon fibers and granular active carbon, 10–40% by weight of at least one binder selected from the group consisting of phenol resin, epoxy resin, petroleum pitch and coal pitch and 20–50% by weight of at least one pore regulator selected from the group consisting of polyvinyl alcohol, polyethylene, polypropylene and polyvinyl chloride.

3. A carbonaceous electrode substrate according to claim 1, wherein said holes have circular cross sections of 0.5–3.0 mm in diameter.

4. A carbonaceous electrode substrate according to claim 1, wherein said sheet is in the form of cloth.

5. A carbonaceous electrode substrate according to claim 1, wherein said sheet is in the form of a textile.

6. A carbonaceous electrode substrate according to claim 1, wherein said sheet is in the form of a reed screen-like sheet.

7. A carbonaceous electrode substrate according to claim 1, wherein said sheet is in the form of a lattice.

* * * * *

UNITED STATES PATENT AND TRADEMARK OFFICE
CERTIFICATE OF CORRECTION

PATENT NO. : 4,666,755
DATED : MAY 19, 1987
INVENTOR(S) : MASATOMO SHIGETA ET AL

It is certified that error appears in the above-identified patent and that said Letters Patent is hereby corrected as shown below:

Column 3, line 5, delete "On the hand" and insert therefor --On the other hand--;

Column 3, line 62, delete "further" and insert therefor --Further--;

Column 3, line 62, delete ", are that," and insert therefor --are that--;

Column 4, lines 42-43, delete "$P = (-\rho b/1.6) \times 100$" and insert therefor --$P = (1-\rho b/1.6) \times 100$--;

Signed and Sealed this

Fifteenth Day of December, 1987

Attest:

DONALD J. QUIGG

*Attesting Officer*  *Commissioner of Patents and Trademarks*